May 11, 1937.   G. R. WOOD   2,079,891
KNIFE SHARPENER
Filed June 6, 1934   2 Sheets-Sheet 1

INVENTOR
George R. Wood
BY
ATTORNEY

May 11, 1937.　　　G. R. WOOD　　　2,079,891
KNIFE SHARPENER
Filed June 6, 1934　　　2 Sheets-Sheet 2
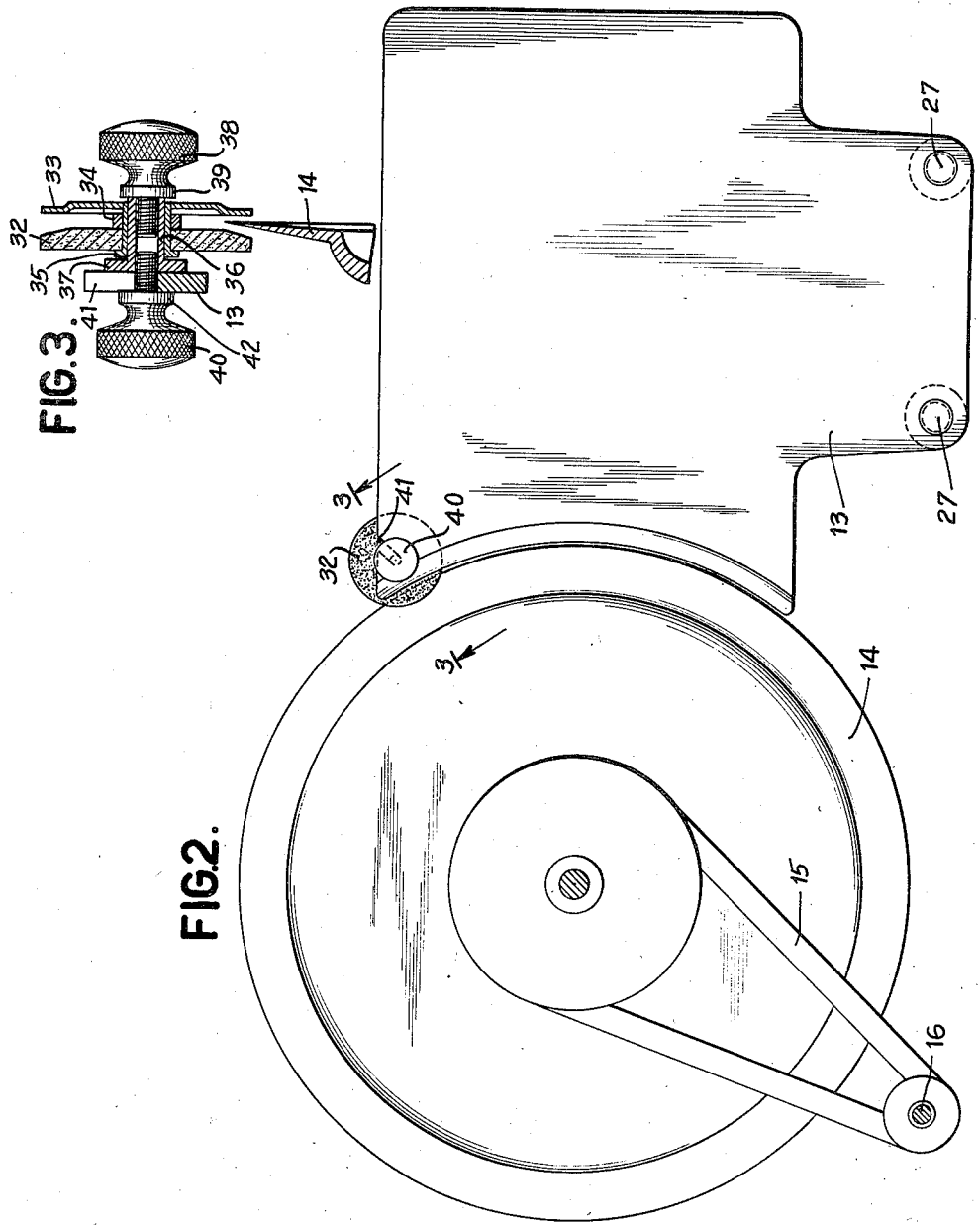

Patented May 11, 1937

2,079,891

UNITED STATES PATENT OFFICE 2,079,891

KNIFE SHARPENER

George R. Wood, Toronto, Ontario, Canada, assignor, by mesne assignments, to The Hobart Manufacturing Company, Troy, Ohio, a corporation of Ohio Application June 6, 1934, Serial No. 729,254

8 Claims. (Cl. 146—102)

This case relates to knife sharpening means, particularly for the knife of a machine for slicing food articles and provided with a gauge plate to govern the slice thickness.

The general object is to provide a sharpening device for the rotary knife of a slicing machine readily attachable and removable from a supporting element adjacent the knife.

The object is further to mount a sharpening device on the gauge plate of a slicing machine.

More particularly the latter object includes adjustment of the sharpening device into and out of contact with the knife by adjustment of the gauge plate.

Other objects will be brought out in the following parts of the specification and understood from the drawings, wherein:

Fig. 2 is an elevation of the knife and gauge plate with the sharpening device; and Fig. 3 is a section on line 3—3 of Fig. 2.

Figure 1:
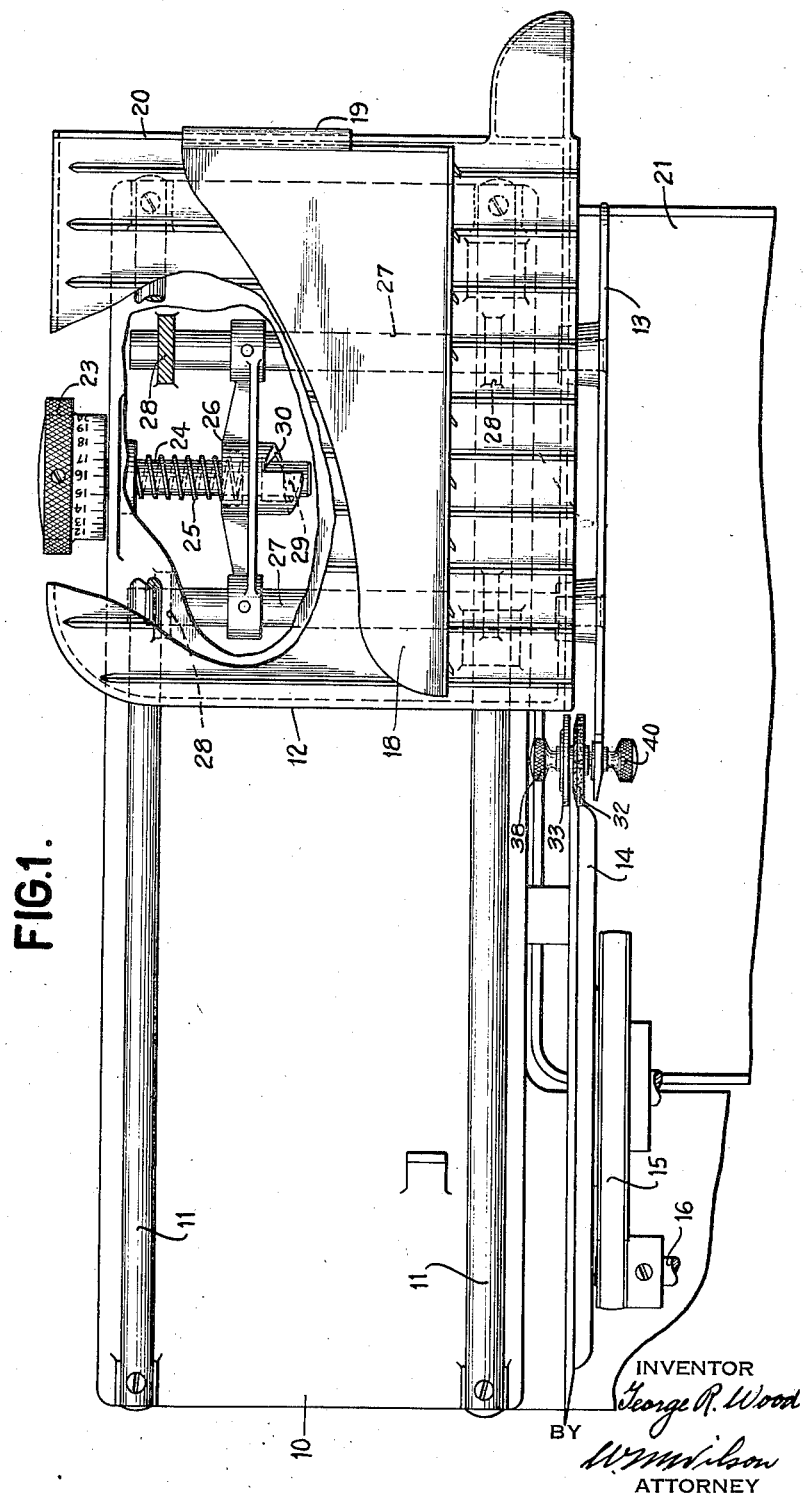
Fig. 1 is a top view of the machine with part of the base and carriage broken away to show the gauge plate adjusting means.

The machine comprises a frame including a base 10 provided with rails 11 for mounting the carriage 12 for slidable movement along the gauge plate 13 and the rotary disk knife 14. The latter is journaled on the frame and rotated by belt 15 from a shaft 16 which may be operated by a motor or by manual power.

The article to be sliced is supported by the carriage and gripped by a clamp 18 slidably mounted by means of a sleeve 19 thereon on the guide 20 of the carriage. To effect a slicing operation, the clamp is moved on its guide toward the gauge plate to engage the article with the latter and hold it engaged while the carriage is moved past the cutting edge of knife 14. The cut slice falls into the tray 21.

To vary the slice thickness, the gauge plate 13 is moved different distances from the cutting plane of the knife 14. The means for adjusting the gauge plate is operated by a graduated knob 23, the graduations of which correspond to the desired slice thickness. Knob 23 is fastened to a shaft 24 journaled in the base beneath the carriage and the track 11 remote from the knife. Surrounding shaft 24 is a coil spring 25 abutting the base at the rear end and a member 26 at the forward end. Member 26 is pinned at opposite sides to the rods 27 slidably mounted in sleeve brackets 28 integral with the base 10. Rods 27 are rigidly secured at their forward ends to the gauge plate 13. Spring 25 urges member 26, rods 27, and gauge plate 13 rearwardly of the knife plane but is limited in its action by the engagement of a pin 29 at the forward end of shaft 24 with a spiral cam 30 fast to member 26. When shaft 24 is rotated by knob 23 counterclockwise (as viewed in Fig. 1) to increase the slice thickness, the pin moves opposite a shallower portion of cam 30 permitting spring 25 to expand and push the member 26 forward thereby increasing the distance between the planes of the gauge plate and knife.

When the shaft 24 is rotated clockwise to decrease the slice thickness, pin 29 moves up on the cam and forces member 26 rearwardly to bring the plane of the gauge plate closer to the cutting plane.

The gauge plate is made use of to support the sharpening device and adjustment of the gauge plate for varying slice thicknesses is utilized during knife sharpening operations to adjust the sharpening device into and out of engagement with the knife.

The sharpening device comprises an emery wheel 32 which engages one side of the knife to form a new edge and a burr-removing disk or wheel 33, preferably of steel, to engage the opposite side of the knife for removing the burr formed by the grinding operation of wheel 32. The wheels 32 and 33 are spaced apart by a washer 34 and are both fast to a hub 35 which is rotatably journaled on a shaft 36 having a flange 37 at one end to limit axial motion of the sharpening wheels and hub in one direction. The shaft is internally threaded to receive a thumb screw 38 at the end opposite the flange 37 the thumb screw being formed with a shoulder 39 for limiting axial movement of the hub 35 in a direction opposite to aforementioned direction. The shaft is slightly longer than the hub thereby permitting slight end play of the latter part between flange 37 and shoulder 39. Threaded into shaft 36 at the end opposite thumb screw 38 is a second thumb screw 40. The shank of screw 40 is left spaced away from the flange 37 of the shaft to fit into slot 41 of the gauge plate which opens on the upper edge of the plate.

After the sharpening assembly is placed in position on the gauge plate by inserting the shank of screw 40 into slot 41, the screw 40 is turned to clamp the gauge plate between flange 42 of the screw and flange 37 of the shaft. The sharpening device is now in operating position.

To engage the emery wheel 32 with the knife, the knob 23 is rotated in a direction to adjust the gauge plate for decreased thickness of slice. In this direction, pin 29 positively engages the cam 30 and moves the gauge plate positively and without play towards the plane of the knife. The sharpening wheel is thus held firmly and without play in sharpening engagement with the knife as is desirable to form the new edge of the knife true with respect to a vertical plane. At this time, the steel disk 33 is freely spaced from the knife and rotation of the knife merely rotates the wheel 32 to effect sharpening of the knife by the latter wheel.

To remove the burr from the knife, the gauge plate is adjusted in a direction for increased slice thickness. Such adjustment may be made quickly and without particular care as the flat side of the wheel 33 will contact the flat side of the knife to define the operating position of the wheel 33 and therefore the gauge plate and cam 30 will stop in correct position even though the knob 23 is adjusted too far. The pin 29 will then merely move away from the cam while spring 25 will press on member 26 to hold the gauge plate 13 and burr stone 33 in correct position. While the burr disk 33 is engaging the knife, the grindstone 32 is free of the knife, washer 34 keeping the disk and grindstone spaced apart so that only one of these elements at a time can engage the knife.

After the sharpening operation has been completed, the hand screw 40 is turned in a direction to relieve the pressure of flange 42 against the side of the gauge plate. The entire sharpening assembly can then be removed from the gauge plate by lifting it out of slot 41. During the normal slicing operations, the sharpening device is left off the gauge plate so as not to interfere with movement of the plate to and from the cutting edge.

While the invention has been disclosed in connection with the illustrated embodiment, it is to be understood that those skilled in the art may make variations, changes, and modifications without departing from the scope of the invention and therefore I wish to be limited only by the claims.

I claim:

1. A knife sharpening assembly to be mounted on a supporting plate, comprising a pair of sharpening wheels, a common hub to which they are rigidly fixed in axially spaced relationship, a hollow shaft passing through the hub for journaling the latter for rotation and provided with a flange to engage one end of the hub, the hollow shaft being internally threaded at one end to receive a flanged screw, the flange of which is engageable with the opposite end of the hub, both flanges coacting to limit the axial movement of the hub, and a screw threaded into the other end of the hollow shaft and provided with a shoulder coacting with the flange on the shaft to clamp the sides of said supporting plate between them.

2. In a machine of the class described, the combination of a knife, an article supporting carriage reciprocable in a plane adjacent the plane of the knife, a gauge plate, means for sharpening said knife, means for removably attaching said sharpening means to said gauge plate in an operative position adjacent said knife for sharpening engagement therewith, said attaching means providing for removal of said sharpening means during the slicing operation of the machine, means for adjusting said gauge plate over a range of positions with respect to said knife to determine the thickness of slices cut by said knife during the slicing operation, said adjusting means providing for establishing sharpening engagement of said knife with said sharpening device when in operative position by movement over a part of its range of adjusting movement.

3. In a machine of the class described, the combination of a rotary knife, an article supporting carriage reciprocable in a plane adjacent the plane of the knife, a gauge plate with which an article on said carriage is adapted to abut, said gauge plate having a slot communicating with one of its edges and extending substantially radially of the axis of said knife adjacent the cutting edge thereof, means to move said gauge plate transversely of the plane of said knife to predetermine the thickness of a slice to be cut from an article on said carriage, and a unitary assembly including grinding and burr removing tools adapted on occasion to be removably fitted in the slot in said gauge plate to sharpen said knife, said assembly being effective in one position of adjustment of said gauge plate to sharpen said knife and in a second position of adjustment thereof to remove the burr therefrom.

4. In a slicing machine having a rotary knife, an article supporting carriage reciprocable past the knife, a gauge plate, the combination of a removable attachment for sharpening the knife comprising spaced, coaxial sharpening and burr removing wheels journalled on a common shaft, said gauge plate having an open slot extending from one of its edges, said slot being adapted to receive said shaft with the sharpening wheel on one side of the knife and the burr removing wheel on the other, means to rigidly hold said shaft in said slot for movement with said gauge plate, and means for effecting movement of said gauge plate over a range of adjustment to control the slice thickness and for selectively effecting engagement of said wheels with said knife over a portion of said range of adjustment.

5. In a machine of the class described comprising a knife, an article supporting means reciprocable in a plane adjacent the plane of the knife, a gauge plate, means to move said gauge plate transversely of the plane of said knife including means operable to effect positive movement of the plate in one direction and yieldable movement in a reverse direction, and means adapted for occasional attachment to said gauge plate to sharpen said knife, said last mentioned means comprising a sharpening tool arranged to be brought into grinding engagement with said knife by the positive movement of said gauge plate and a burr removing tool arranged to be engaged with said knife by the yieldable movement of said gauge plate.

6. In a machine of the class described, the combination of a rotary knife, an article supporting carriage reciprocable in a plane adjacent the knife, a gauge plate with which an article on said carriage is adapted to abut to determine the thickness of a slice to be cut therefrom, means to move said gauge plate transversely of the plane of the knife between positions effective to produce slices of minimum and maximum thickness, knife sharpening means, means for detachably connecting said sharpening means to said gauge plate for movement into engagement with said knife by movement of the gauge plate to a position intermediate said minimum and maximum slice positions.

7. In a food handling apparatus of the class described, the combination of a rotary knife, an adjustable gauge plate, means movable with and removably mounted on said plate in a position operatively adjacent said knife for sharpening said knife, and means operable for adjusting said gauge plate and said sharpening means over a range of movement to effect engagement of said sharpening means with said knife when the sharpening means is mounted in operative position on said gauge plate, said means being also operable to effect adjustment of said gauge plate over a range of movement to determine slice thickness in the operation of said apparatus with said sharpening means removed from operative position on said gauge plate.

8. In a machine of the class described, the combination of a rotary knife, an article supporting carriage reciprocable in a plane adjacent the plane of the knife, a gauge plate with which an article on said carriage is adapted to abut to determine the thickness of a slice to be cut from the article, means to move said gauge plate transversely of the plane of said knife between positions in which slices of minimum and maximum thickness will be cut from an article and a knife sharpening tool removably carried by said gauge plate and adapted to be moved into and out of grinding engagement with said knife by movement of the gauge plate to and from a position intermediate said minimum and maximum slice positions.

GEORGE R. WOOD.